Patented Jan. 15, 1946

2,393,115

UNITED STATES PATENT OFFICE 2,393,115

PROCESS FOR MANUFACTURE OF $MgCl_2$

Robert B. MacMullin, Niagara Falls, N. Y., assignor to The Mathieson Alkali Works, Inc., New York, N. Y., a corporation of Virginia No Drawing. Application March 28, 1942, Serial No. 436,627

1 Claim. (Cl. 23—91)

This invention relates to improvements in the production of magnesium chloride, the essential raw material for the production of metallic magnesium by electrolysis of the fused chloride. The invention provides important economies, through improvement of chemical efficiency, in the production of magnesium chloride and thus in the production of metallic magnesium.

More particularly, this invention relates to improvements in the production of aqueous magnesium chloride liquors by reaction between the mixed oxides of magnesium and calcium produced by calcination of dolomite, the waste aqueous calcium chloride liquor from the ammonia soda process and carbon dioxide.

In the ammonia soda process, sodium bicarbonate and ammonium chloride are formed by carbonating an aqueous ammoniacal sodium chloride liquor. The sodium bicarbonate is the commercial product of the process. The ammonia, because of its cost, must be recovered from the ammonium chloride for cyclic re-use in the process. This recovery is usually effected by decomposing the ammonium chloride with lime in a distillation operation from which an aqueous calcium chloride liquor is discharged as a waste residue. This waste liquor, comprising the chlorides of calcium and sodium, about 9% $CaCl_2$ and about 4% NaCl being representative contents of these salts, constitutes an advantageous raw material for the production of magnesium chloride for electrolysis since the magnesium chloride fusions subjected to electrolysis usually must include chlorides other than magnesium chloride such as sodium or potassium chloride to form an electrolyte of the desired melting point, viscosity and density.

A magnesium chloride product appropriate for the electrolysis can be produced from this waste calcium chloride liquor by calcining dolomite to produce mixed oxide of magnesium and calcium, adding these mixed oxides to this waste liquor to hydrate the mixed oxides and to form a slurry of the mixed hydrates, carbonating this slurry and concentrating the resulting magnesium chloride liquor after separating precipitated calcium carbonate.

However, the waste calcium chloride liquor from the ammonia soda process also contains sulphates, particularly calcium sulphate. In conventional practice, the temperature of the liquor in the decomposition-distillation operation just described is regulated to minimize scaling of the apparatus in which it is carried out with calcium sulphate hemihydrate. Scaling nevertheless usually occurs to some limited extent. The waste liquor thus contains calcium sulphate in solution and, usually, suspended calcium sulphate hemihydrate.

When mixed oxides of magnesium and calcium, produced for example by calcining dolomite, are added to such an aqueous calcium chloride liquor, hydration does not proceed uniformly, the resulting slurry is not uniform and carbonation of the resulting slurry proceeds with relatively low chemical efficiency measured in terms of magnesium chloride recovery against magnesium chloride potentially available from the mixed oxides. Apparently sulphates, particularly soluble sulphates, present in the waste calcium chloride liquor from the ammonia soda process, even though present in relatively small amount, impede the hydration of the mixed oxides produced by calcination of dolomite to an extent such that the formation of a uniform slurry and the realization of high chemical efficiency in subsequent carbonation of the slurry cannot be attained unless special precautions are taken.

In accordance with my invention, I carry out the hydration of the mixed oxides with an aqueous medium substantially free from soluble sulphates and I limit the proportion of such medium used to that required to produce a dry mixture of calcium hydrate and magnesium oxide, and I then add the resulting mixture of calcium hydrate and magnesium oxide to the calcium chloride liquor containing sulphates. Once this limited hydration is complete, the soluble sulphates present in the waste calcium chloride liquor are without effect and a smooth and uniform slurry is rapidly and easily formed from the mixture of calcium hydrate and magnesium oxide notwithstanding the presence of sulphates including soluble sulphates in the liquor then used.

The limited hydration of the mixed oxides of magnesium and calcium may be effected with water substantially free from soluble sulphates. Such operation, however, involves dilution of the magnesium chloride liquor ultimately formed to the extent that such water is added for hydration. To avoid such dilution, I add sufficient barium chloride or other soluble barium salt to an appropriately limited portion of the waste calcium chloride liquor to precipitate sulphates present, then hydrate the mixed oxides with this portion of liquor freed from soluble sulphates, and thereafter add the mixture of calcium hydrate and magnesium oxide thus formed to another portion of the calcium chloride liquor, in which the presence of soluble sulphates is of no consequence, to form a slurry of mixed hydrates of magnesium and calcium subsequently subjected to carbonation. The precipitated barium sulphate need not be separated from that portion of the waste calcium chloride liquor used for hydration of the mixed oxides prior to addition of the mixed oxides since the sulphates present in insoluble form, as barium sulphate, do not interfere with the hydration. The soluble barium salt is with advantage added to that portion of the waste calcium chloride liquor used for hydration as an aqueous solution. The proportion of soluble barium salt should correspond, stoichiometrically, with the proportion of soluble sulphates present in this waste liquor.

In operation, for example: 100 tons per day of dolomite may be calcined in a rotary kiln to produce about 50 tons per day of mixed oxides and about 69 tons per day of $CO_2$ in a gas mixture of 25% concentration. The mixed oxides may be hydrated with about 21 tons per day of a waste calcium chloride liquor from the ammonia soda process originally containing about 9.2% $CaCl_2$, about 4.1% NaCl and about 0.2% $CaSO_4$, after precipitation of the sulphates present as barium sulphate by the addition of about 1/3 ton of an aqueous solution containing about 20% $BaCl_2$. The mixed hydrates thus formed may then be added to about 540 tons per day of waste calcium chloride liquor of the same composition, without requiring precipitation of sulphates from this portion of the liquor, to produce a slurry of mixed hydrates which is carbonated, for example with part of the gas mixture produced in calcination of the dolomite. About 42 tons per day of carbon dioxide may be absorbed in this carbonation.

After separation of precipitated calcium carbonate, about 664 tons per day of an aqueous liquor containing about 6.7% $MgCl_2$ and about 3.4% NaCl may be produced in this manner.

When the hydration of the mixed oxides of magnesium and calcium is carried out in accordance with my invention, the limited hydration proceeds without difficulty, and a smooth and uniform slurry is rapidly and easily formed from the resulting mixture of calcium hydrate and magnesium oxide. Subsequent carbonation of this slurry of mixed hydrates is facilitated and improved yields of magnesium chloride are recovered.

My invention involves subject matter that in some respects is similar to subject matter disclosed in United States Patent No. 2,359,829.

I claim:

In the production of aqueous magnesium chloride liquors by carbonating slurries of mixed hydrates of magnesium and calcium in aqueous calcium chloride liquors containing soluble sulphates, the improvement which comprises calcining dolomite to form mixed oxides of magnesium and calcium, adding sufficient of a soluble barium salt to a portion of the calcium chloride liquor to precipitate the sulphates, hydrating the mixed oxides in this portion of liquor freed from soluble sulphates limited to form a dry mixture of calcium hydrate and magnesium oxide, and adding this mixture to another untreated portion of the calcium chloride liquor containing soluble sulphates to produce a slurry of mixed hydrates.

ROBERT B. MacMULLIN.